United States Patent Office 2,965,535
Patented Dec. 20, 1960

2,965,535

PENTACHLOROBENZENESULFENYL CHLORIDE

Gail H. Birum, Dayton, Ohio, assignor to Monsanto Chemical Company, St. Louis, Mo., a corporation of Delaware No Drawing. Filed Dec. 5, 1955, Ser. No. 550,833

1 Claim. (Cl. 167—30)

The present invention relates to chlorinated organic sulfur compounds and more particularly provides the hitherto unknown pentachlorobenzenesulfenyl chloride:

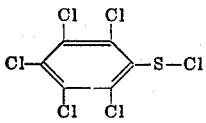

The invention also provides methods of producing the new sulfenyl chloride by reaction of pentachlorothiophenol or of pentachlorophenyl disulfide with elemental chlorine.

Pentachlorobenzenesulfenyl chloride is a well characterized crystalline compound having a melting point of 104–106° C. It is a valuable biological toxicant being active against both fungi and bacteria. The new compound is also very reactive chemically. Thus, it condenses with acetone:

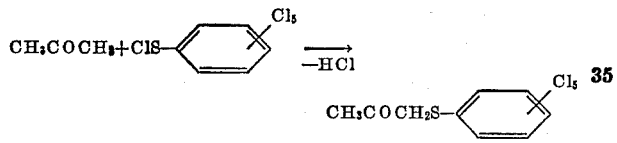

The 1-pentachlorophenyl-2-propanone thus obtained possesses plant growth effects. Pentachlorobenzenesulfenyl chloride also reacts with trialkyl phosphites:

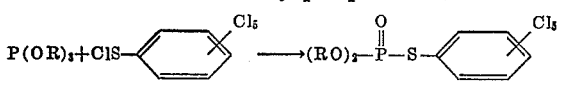

The O,O-dialkyl S-pentachlorophenyl phosphorothioates thus obtained have good insecticidal properties. With potassium alkyl xanthates the pentachlorobenzenesulfenyl chloride gives disulfides of value as extreme-pressure resisting additives for lubricants and as rubber-compounding agents, thus:

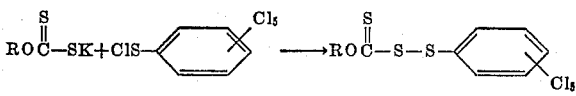

With ammonium phosphorothioates there are obtained valuable phosphorus-containing toxicants:

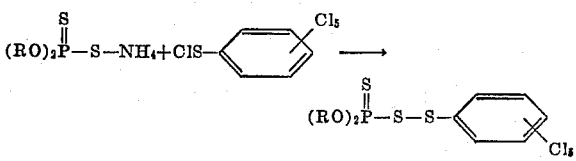

As disclosed in my copending application, Serial No. 543,265, filed October 27, 1955, trithiane adds with from 1 to 3 moles of the pentachlorobenzenesulfenyl chloride to give adducts having fungicidal, insecticidal and bacteriostatic properties.

In preparing the pentachlorobenzenesulfenyl chloride I prefer to operate as follows:

The pentachlorothiophenol or the pentachlorophenyl disulfide is mixed with an inert diluent or dissolved in an inert solvent, and chlorine is led into the resulting mixture or solution at ordinary or increased temperatures. Since the reaction is exothermic, cessation of temperature rise generally indicates termination of the reaction. Cessation in chlorine absorption as evidenced by escape of chlorine from the reaction equipment also may be used to determine completion of the reaction. Conversion of the thiophenol or the disulfide to the sulfenyl chloride takes place in the absence of a halogenation catalyst. However, the reaction may be effected in the presence of catalysts, e.g., elemental iodine, iodine chloride, antimony chloride, molybdenum chloride, etc.

The invention is further illustrated, but not limited by the following examples:

Example 1

A mixture of 250 ml. of carbon tetrachloride, 84.2 g. (0.3 mole) of pentachlorothiophenol and 0.2 g. of iodine was placed in a 1-liter, 4-neck flask equipped with thermometer, stirrer, condenser, and a chlorine inlet tube designed to extend below the liquid content of the flask. Chlorine was rapidly stirred into the mixture for about 2.5 hours, at the end of which time the initial exothermic reaction (temperature increase to 35° C.) had abated, and all of the solid had dissolved. Removal of the carbon tetrachloride from the resulting reaction mixture under water-pump pressure gave as residue 96.0 g. (100% theoretical yield) of the crude pentachlorobenzenesulfenyl chloride, M.P. 100–104° C. Recrystallization from hexane gave the purer product, orange crystals, M.P. 104–106° C., which analyzed as follows:

|  | Found | Calcd. for $C_6Cl_6S$ |
| --- | --- | --- |
| Percent C | 21.47 | 22.7 |
| Percent Cl | 66.36 | 67.2 |
| Percent S | 9.55 | 10.1 |

Example 2

In a larger run, chlorine was passed into a stirred slurry of 750 ml. of carbon tetrachloride, 484 g. (1.72 moles) of pentachlorothiophenol and 0.5 g. of iodine. The temperature of the reaction mixture rose to a maximum of 39° C. At the end of three hours the pentachlorothiophenol had dissolved entirely, the temperature began to fall, and chlorine began to escape through the condenser which formed a part of the reaction equipment. Mantle heating was applied, and introduction of chlorine was continued for an additional twenty minutes while the temperature of the reaction mixture was held at 60–77° C. Removal of the carbon tetrachloride from the resulting reaction mixture by distillation under reduced pressure gave as residue 534 g. (98.5% theoretical yield) of the substantially pure pentachlorobenzenesulfenyl chloride.

Example 3

Carbon tetrachloride (300 ml.) and 133.7 g. of pentachlorothiophenol were placed in a 2-liter, 4-neck flask equipped with stirrer, thermometer, condenser and a chlorine-delivery tube extending above the liquid surface and connected through a sulfuric acid wash bottle to a chlorine source. No catalyst was added. A rapid flow of chlorine was started. The temperature of the reaction mixture increased from an initial 20° C. to 35° C. within 30 minutes and then began to drop. The pentachlorothiophenol went into solution during this period, the nature of the reaction mixture changing from a white suspension to a red solution. Flow of chlorine into the reaction mixture was continued for an additional 24 minutes while the temperature of the reaction mixture was increased to 59° C. by external warming. Removal of the unreacted carbon tetrachloride at reduced pressure (first at water-pump pressure and then at 0.2 mm.) gave as residue 144.5 g. (96.5% theoretical yield) of the substantially pure pentachlorobenzenesulfenyl chloride, M.P. 99–103° C.

Testing of the pentachlorobenzenesulfenyl chloride against the bacteria *Micrococcus pyogenes* var. *aureus* showed that an oil-in-water emulsion of the chloride in a concentration of one part of chloride per 1,000 parts of water inhibited growth of this micro organism.

This application is a continuation-in-part of my copending application Serial No. 543,265, filed October 27, 1955, which application has issued as Patent No. 2,774,707, dated December 18, 1956.

What I claim is:

The method of preventing the growth of bacteria which comprises exposing said bacteria to a toxic quantity of pentachlorobenzenesulfenyl chloride.

References Cited in the file of this patent

UNITED STATES PATENTS

| | | |
|---|---|---|
| 2,376,650 | Ballman | May 22, 1945 |
| 2,484,061 | Wood | Oct. 11, 1949 |
| 2,647,143 | Pitt et al. | July 28, 1953 |

OTHER REFERENCES

Kharasch et al.: Chem. Reviews, volume 39, page 280 (1946).

Frear: A Catalogue of Insecticides and Fungicides, volume 1, page 78 (1947).